United States Patent Office 3,507,903
Patented Apr. 21, 1970

3,507,903
2,6-DICYANO-4-NITROANILINE AND
PREPARATION THEREOF
Alois Gottschlich and Klaus Leverenz, Leverkusen, Germany, assignors to Farbenfabriken Bayer Aktiengesellschaft, Leverkusen, Germany, a corporation of Germany
No Drawing. Filed Oct. 9, 1967, Ser. No. 673,998
Claims priority, application Germany, Oct. 15, 1966,
F 50,453
Int. Cl. C07c 121/54, 107/06; C09b 29/24
U.S. Cl. 260—465                                3 Claims

ABSTRACT OF THE DISCLOSURE

The compound 2,6-dicyano-4-nitroaniline, prepared by reacting 1,3-dicyano-5-nitrobenzene with hydroxylamine or its salts in the presence of alkaline compounds e.g. sodium hydroxide is useful as an intermediate in the preparation of azo dyestuffs.

The object of invention comprises a process for the production of the hitherto unknown 2,6-dicyano-4-nitroaniline of the formula

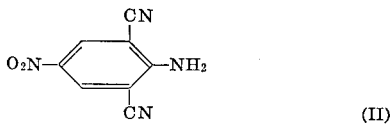

The process is characterized in that 1,3-dicyano-5-nitrobenzene is reacted according to the reaction scheme given below in the presence of compounds of alkaline reaction with hydroxylamine or its salts:

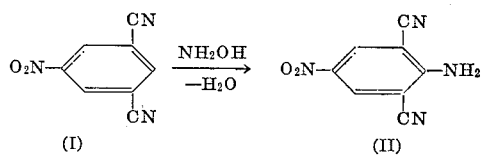

It is already known to react aromatic-carbocyclic and -heterocyclic nitro compounds with hydroxylamine in the presence of compounds of alkaline reaction to form nitroamino compounds.

According to the statements made in Houben-Weyl, "Methoden der organischen Chemie," 4th edition, volume XI/I, page 17, however, the reaction succeeds in the benzene series only with compounds containing at least two nitro groups in the benzene ring. On the other hand, the reaction of 3-nitrobenzaldehyde with hydroxylamine leads to the formation of the oxime, the reaction of 3-nitrobenzoic acid with hydroxylamine leads to the formation of the corresponding hydroxamic acid (Meisenheimer, Patzig: Berichte der deutschen chemischen Gesellschaft, 39, 1906, page 2533). Aromatic nitriles react, according to Houben-Weyl, "Methoden der organischen Chemie," 4th edition, vol. VIII, pages 692–694, to give hydroxamic acid amides.

On account of this state of the art, it was extremely surprising and not foreseeable that 1,3-dicyano-5-nitrobenzene would react under the conditions of the present process with hydroxylamine with the formation of 2,6-dicyano-4-nitroaniline.

The 1,3-dicyano-5-nitrobenzene used as starting compound is known. Its preparation is described, inter alia, in J. Org. Chem., 11, 1946, pages 378–383 and in Yakugaku Zasshi, 78, 1958, pages 1401–1403.

The process according to the invention is carried out in detail by reacting 1,3-dicyano-5-nitrobenzene with hydroxylamine or its salts in a preferably organic or aqueous-organic solution or suspension and in the presence of compounds of alkaline reaction at temperatures of about 0° to about 80° C., preferably at temperatures of 20–80° C.

Suitable organic solvents are mainly water-miscible mono- or polyhydric alcohols as well as aliphatic ethers containing hydroxyl groups or mixtures of these solvents. The following compounds may be mentioned by way of example: methanol, ethanol, propanol-(1), propanol-(2), ethanediol-(1,2), propanediol-(1,3), butanediol-(1,3), butanediol-(1,4), propanetriol-(1,2,3), butanetriol-(1,2,4), diethyleneglycol, triethyleneglycol, tetraethyleneglycol, dipropyleneglycol and tripropyleneglycol.

Suitable hydroxylamines are, for example, hydroxylammonium chloride, hydroxyl-ammonium nitrate, hydroxyl-ammonium phosphate, hydroxyl-ammonium sulfate.

Suitable compounds of alkaline reaction are, for example: alkali metal hydroxides, such as sodium hydroxide or potassium hydroxide, as well as alkali metal alcoholates, for example, sodium methylate, sodium ethylate, sodium isopropylate, sodium glycolate and the corresponding potassium compounds. The alcoholates are used in substance or in the form of their alcoholic solutions.

In the process according to the invention, 1–1.5 moles hydroxylamine and 1–5 moles of the above compounds of alkaline reaction are used per mole 1,3-dicyano-5-nitrobenzene.

The 2,6-dicyano-4-nitroaniline obtainable according to the process of the invention is suitable, for example, for the production of 1,4-diamino-2,6-dicyanobenzene and as diazo components for the production of azo dyestuffs.

The parts given in the following examples are parts by weight.

Example 1

50 parts 1,3-dicyano-5-nitrobenzene of melting point 206–208° C. are dissolved at 120° C. in 900 parts diethylene glycol. The mixture is rapidly cooled to room temperature by cooling with ice, and 22 parts of finely powdered hydroxyl-ammonium chloride and a solution of 60 parts potassium hydroxide in 300 parts methanol are then successively added. The reaction mixture acquires a red colour and the precipitate formed after cooling is dissolved. After stirring for 2 hours, the reaction mixture is poured into 3000 parts of ice-water, the resultant yellowish precipitate is filtered off with suction after standing overnight, washed with water and dried. About 40 parts 2,6-dicyano-4-nitroaniline of a melting point of about 290–300° C. are thus obtained. This crude product can be used for the production of azo dyestuffs without further purification. For purification, the crude product is recrystallised from pyridine, whereby pale yellow crystals of melting point 310–311° C. are obtained. Molecular weight (by mass spectrography) 188.

Elementary analysis.—Calculated (percent): C, 51.1; H, 2.1; N, 29.8; O, 17.0. Found (percent): C, 51.2; H, 2.3; N, 29.6; O, 17.0.

Diazotisation with nitrosyl-sulphuric acid in concentrated sulphuric acid and coupling with 1-N,N-diethylamino-3-ethoxybenzene yields a blue azo dyestuff of the formula

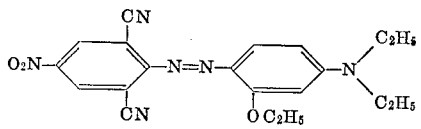

Example 2

50 parts 1,3-dicyano-5-nitrobenzene and 26 parts hydroxylammonium sulphate are suspended in 500 parts triethylene glycol and mixed at room temperature with a sodium ethylate solution prepared from 20 parts sodium and 250 parts ethanol. After stirring for one hour, the solution is poured into about 3000 parts of ice-water. The resultant precipitate is filtered off with suction after standing overnight, washed with water and dried. A product is obtained, which is identical with the compound described in Example 1.

We claim:
1. 2,6-dicyano-4-nitroaniline.
2. Process for the production of 2,6-dicyano-4-nitroaniline, by reacting 1 mole of 1,3-dicyano-5-nitrobenzene with 1–1.5 moles of hydroxylamine or its salts at temperatures of 0° to 80° C. and in the presence of 1–5 moles of alkali metal hydroxides or alkali metal alcoholates.
3. Process of claim 2 wherein the temperature of reaction is 20° to 80° C.

References Cited

UNITED STATES PATENTS

| | | | |
|---|---|---|---|
| 2,993,886 | 7/1961 | Weis et al. | 260—465 X |
| 3,257,190 | 6/1966 | Soper | 260—465 X |
| 3,287,100 | 11/1966 | Rohr et al. | 260—465 X |

OTHER REFERENCES

Morison et al.: Organic Chemistry, p. 400 (1962).
Wagner et al.: Synthetic Organic Chemistry, pp. 670–671 (1964).

CHARLES B. PARKER, Primary Examiner
D. H. TORRENCE, Assistant Examiner

U.S. Cl. X.R.
260—206, 551, 578, 566, 500.5